March 18, 1969

YUJI SAKAI ET AL 3,433,896

TELEVISION RECEIVER HIGH VOLTAGE POWER
SUPPLY PROTECTION CIRCUIT
Filed Feb. 20, 1967

INVENTORS
YUJI SAKAI, RYOICHI NAKAYAMA,

BY Stevens, Davis, Miller & Mosher

ATTORNEYS

United States Patent Office 3,433,896
Patented Mar. 18, 1969

3,433,896
TELEVISION RECEIVER HIGH VOLTAGE POWER SUPPLY PROTECTION CIRCUIT
Yuji Sakai, Takatsuki-shi, and Ryoichi Nakayama, Kyoto, Japan, assignors to Matsushita Electronics Corporation, Osaka, Japan, a corporation of Japan
Filed Feb. 20, 1967, Ser. No. 617,189
Claims priority, application Japan, Feb. 24, 1966, 41/11,528
U.S. Cl. 178—7.3      2 Claims
Int. Cl. H04n 3/18

ABSTRACT OF THE DISCLOSURE

A television circuit to protect the high voltage rectifier tube and fly-back transformer including a rectifier tube with warm-up characteristics similar to the HV rectifier tube and having heaters driven by the fly-back transformer, said rectifier tube controlling the grid bias of the shunt control tube biasing it toward conduction as the HV rectifier and rectifier tubes warm-up together.

---

Figure 1:
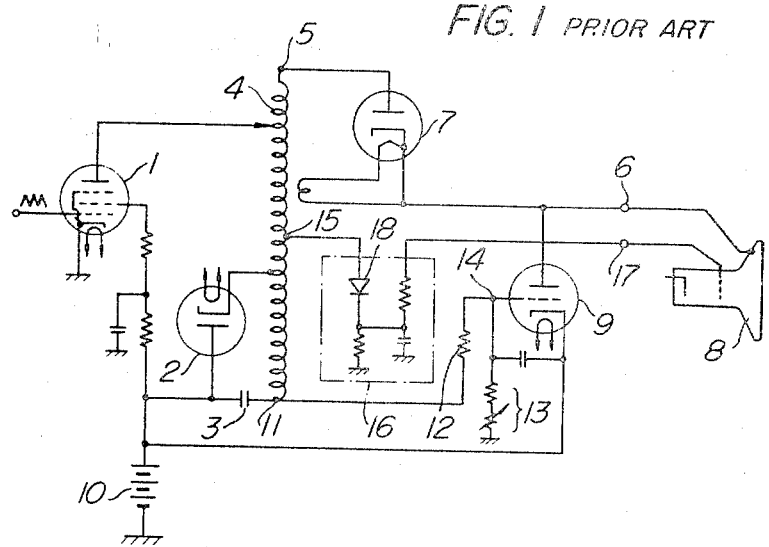

The present invention relates to an improvement of the D.C. high voltage supplying device in the television image receiver, and, strictly, to the device for supplying respectively the stabilized D.C. high voltage to be impressed on the plate of the picture tube, especially, the color picture tube, and the D.C. voltage to be impressed on the focus electrode of this image receiver.

Conventional television receiving systems have a HV rectifier tube coupled between the high side of the fly-back transformer and the first high voltage terminal of the picture tube. A regulator tube, usually in shunt with the HV picture tube terminal, controls the current through the HV rectifier tube and the grid of the regulator is biased by a voltage divider operating off the fly-back transformer. A rectifier stage is coupled between the fly-back transformer and the picture tube second output terminal. With conventional circuits the regulator tube is warmed and driven to conduction before the HV rectifier tube reaches a hot cathode or steady state conditions. With the high fly-back voltage on the HV rectifier plate, cold conduction (arcing) occurs causing cathode burning and damage.

The present invention avoids these problems by keeping the regulator tube biased below cut-off until the HV rectifier tube has a chance to warm. To insure this action, a rectifier tube in the rectifier stage having the same warm-up characteristics and with heaters driven by the same source as the HV rectifier is used to control the regulator tube grid bias.

According to the present invention, the D.C. high voltage supply device comprising a voltage regulator, the plate of which is connected to the high voltage output terminal and the cathode of which is connected to the B-power supply terminal, and a high voltage rectifier tube, the cathode of which is connected to said D.C. high voltage output terminals, the plate of which is connected to the high voltage tap of a fly-back transformer and the heater of which is connected to a heater winding of the fly-back transformer; said D.C. high voltage supply device is constituted in such a way that the voltage regulator is not activated before the high voltage rectifier, in the starting of the system.

An object of the present invention is to provide a D.C. high voltage supplying device in the television image receiver equipped with a fly-back transformer, a power supplying means for supplying it with a saw tooth current, a high voltage rectifier tube with its plate and cathode coupled between the first high voltage terminal of the fly-back transformer and the first D.C. high voltage output terminal, and with its heater connected to the heater winding of the fly-back transformer, a rectifier inserted between the second high voltage terminal of the fly-back transformer and the second D.C. high voltage output terminal, and a shunt regulator tube with its plate connected to said first high voltage output terminal and its cathode to the positive pole of the B-power supply. The improvement comprises said rectifier having a rectifier tube with the characteristics of nearly the same warm-up time as the warm-up time of said high voltage rectifier tube used as the rectifier element, with its heater connected to the second heater winding of said fly-back transformer, and the junction of the resistances inserted between the cathode of said rectifier tube and the ground is connected to the control grid of said shunt regulator tube, whereby said shunt regulator tube is held in a cut-off condition during the period of time of said high voltage rectifier tube being de-energized.

Figure 2:
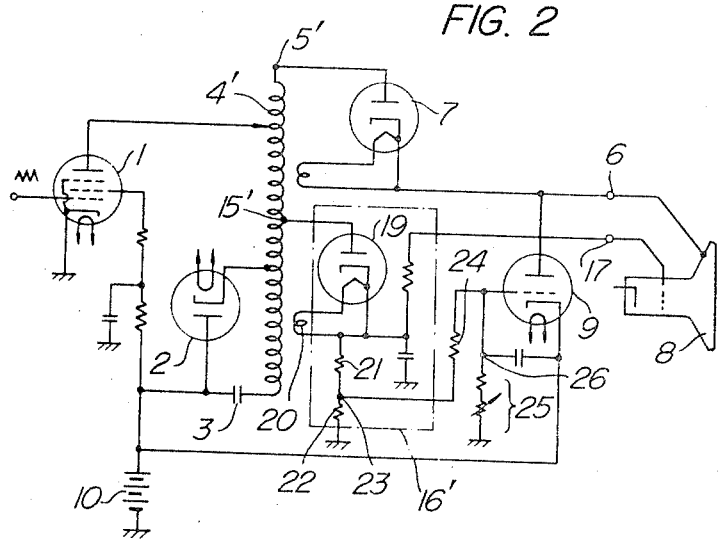

Other objects and advantages will be apparent to those skilled in the art in connection with the under-mentioned description and accompanying drawings, in which:

FIG. 1 is an electric circuit diagram for a conventional D.C. high voltage supplying device in television image receivers, and FIG. 2 is an electric circuit diagram for a D.C. high voltage supplying device in the television image receiver embodying the present invention.

Generally, in color television image receivers, such a circuit system as shown in FIG. 1 is employed as its D.C. high voltage supplying device. Thus, the high voltage rectifier tube 7 is connected between the output terminal 6 and the high voltage terminal 5 of the fly-back transformer 4 in which a saw tooth current is produced by the cooperation of the horizontal output tube 1, the damper tube 2 and the booster condenser 3, to obtain, at the output terminal 6, the D.C. high voltage to be impressed on the plate of the picture tube 8. Then, as a means of stabilizing the D.C. high voltage obtained at the output terminal 6, that is, a means for checking the variation of the D.C. high voltage with the change of the beam current in the picture tube 8, the high voltage regulator is connected to the output terminal 6. The high voltage regulator tube, for example type 6BK4, used as the component element of the afore-mentioned high voltage regulator, is indicated by 9. Its plate is connected to the output terminal 6, and its cathode to the positive pole of the B-power supply 10. Its heater is connected to a commercial power supply through a series resistance or a low voltage transformer, and its control grid is connected to the junction 14 which is between the resistances 12 and 13, which are in series and inserted between the boost voltage output terminal 11 and ground. In this way, the shunt regulator tube 9 is controlled in the intended direction of high voltage stabilization in correspondence with the variation of the boosted voltage, that is, the change of the beam current in the picture tube 8. In a set like the color television picture tube in which the beam current is relatively large, the direct heated type is hardly usuable as the high voltage rectifier tube 7, and therefore, the indirect heated type, such as type 3A3, is usually used. The power to energize the heater of the high voltage rectifier tube is supplied through the fly-back transformer, thereby assuring a high degree of insulation on the heater wiring.

The second high voltage tap 15 of the fly-back transformer 4 is connected to the output terminal 17 through the rectifier 16 to obtain the D.C. high voltage to be impressed on the focus electrode of the picture tube 8 at the output terminal 17. The semiconductor type diode used as the component element of the rectifier 16 is indicated by 18.

In the usual color television image receiver set to which the D.C. high voltage supplying device of a construction such as described above, after the set is switched on, and before steady state is reached, the high voltage rectifier tube 7, especially its cathode, is often damaged by reason of melting. The cause for this has first been discovered by the present inventors. As clearly seen from the above description, in the high voltage rectifier tube 7, while the power to energize the heater is supplied through the fly-back transformer 4, the power to energize the heater in the high shunt regulator 9 is supplied from the commercial A.C. source. Therefore, even if the characteristic of the warm-up time span of both electron tubes is identical, the shunt regulator 9 enters into the steady state before the high voltage rectifier tube 7 does. Accordingly, in the period after the shunt regulator tube 9 enters into the steady state and before the high voltage rectifier tube 7 enters into the steady state, potentials greatly exceeding the specified safe values appear respectively on the high voltage terminal and taps 5, 15 as well as the boost voltage output terminal 11, and, as a result, the control grid of the shunt regulator 9 controlled by the divided voltage that has been boosted is biased only slightly or to a positive bias.

The period mentioned above is usually about several seconds because the high voltage rectifier tube is the indirect heated type. During this period of time, abnormally high voltage is imposed on the plate of the high voltage rectifier tube 7, which is in an unenergized condition, and consequently, electrons are emitted from the cathode of the high voltage rectifier tube 7. The current due to this cold emission of the high voltage rectifier tube 7 is passed to the shunt regulator tube 9 which is under the condition mentioned above. Thus, when the aforementioned electrons are emitted locally from the cathode surface of the high voltage rectifier tube 7, this surface is heated to a high temperature, producing a spark between the plate and the cathode. Because of this concentrated current, the cathode is sometimes melted, and the cathode and/or the heater is damaged as a result. If this condition remains unchanged, burning of the fly-back transformer can develop.

The device, according to this invention avoids disadvantages as described above, in an efficient and inexpensive manner. An example of the D.C. high voltage supplying device in the television image receiver according to this invention is shown in FIG. 2. In this figure, the components corresponding to those shown in FIG. 1 are identified with the same numerals. In the device embodying this invention shown in FIG. 2, between the second high voltage tap 15' of the fly-back transformer and the second output terminal 17, is inserted the rectifier 16' having the rectifier tube 19 of indirect heated type as the rectifier element. The rectifier tube 19 is required to have the characteristic of warm-up time nearly equivalent to the warm-up time of the high voltage rectifier tube 7, connected to the high voltage terminal 5'. When the high voltage rectifier tube 7 used is 3A3 type, use of 1S2 type rectifier tube 19 is preferred. The heater of the rectifier tube 19 is connected to the heater winding 20 of the fly-back transformer 4'. The junction 23 is connected between the resistances 21 and 22, which are connected in series between the cathode of the rectifier tube 19 and ground. The resistances 24 and 25 are connected in series between the ground and junction 23, and the junction 26 is connected between the resistances 24 and 25 and also to the control grid of the shunt regulator 9.

When the device of FIG. 2 as described above is used in the television image receiver, after the set is switched on, the heater in the shunt regulator 9 is energized earlier than those in the high voltage rectifier tube 7 and the rectifier tube 19. However, the cathode is given a positive potential from the B source 10, and the rectifier tube 19 is in an unenergized condition. Therefore, deep bias is imposed on the control grid of the shunt regulator 9, and the cut-off condition is maintained as a result. Accordingly, during the period of time after the shunt regulator 9 enters into the stationary condition, and before the high voltage rectifier tube enters into the stationary condition, in the high voltage rectifier tube 7, even if an abnormally high potential is applied to its plate, electrons do not flow because the shunt regulator 9 is in a cut-off condition, and no current path is provided. Thus the current path for tube 7 is provided through tube 9 at a rate determined by the rate at which tubes 7 and 19 warm-up together. In this way, the high voltage rectifier tube 7 is protected from damage due to cold emision.

As described above, the D.C. high voltage supplying device in the television image receiver of this invention affords protection of the high voltage rectifier tube from damage due to the cold emission during the period of its warm-up time, and moreover, avoids the chance of burning in the fly-back transformer, or other connected components.

What is claimed is:

1. A D.C. high voltage supplying circuit in the television image receiver equipped with a fly-back transformer, a power supplying means for supplying it with a saw tooth current, a high voltage rectifier tube with its plate and cathode inserted between a first high voltage terminal of the fly-back transformer and a first D.C. high voltage output terminal, and with its heater connected to a heater winding of the fly-back transformer, a rectifier stage inserted between a second high voltage terminal of the fly-back transformer and a second D.C. high voltage output terminal, and a shunt regulator tube with its plate connected to said first high voltage output terminal and its cathode to the positive pole of the B-power supply, the improvement comprising, in said rectifier stage, a rectifier tube having the characteristic of nearly the same warm-up time as the warm-up time of said high voltage rectifier tube is provided as the rectifier element, with its heater connected to a heater winding of said fly-back transformer, and a voltage divider coupled between the cathode of said rectifier tube and ground being provided with a connection coupled to the control grid of said shunt regulator tube to control the cut-off and conduction of said regulator tube in accordance with the condition of said rectifier tube so that the regulator tube conducts only when the high voltage rectifier tube is warm enough to pass current without damage.

2. A circuit as set forth in claim 1 wherein the voltage divider comprises a pair of series resistors and said control grid being connected to the junction thereof.

References Cited

UNITED STATES PATENTS 2,402,472   6/1946   Usselman _____ 315—102 XR
3,368,105   2/1968   Shimada _____ 315—14

ROBERT L. GRIFFIN, *Primary Examiner.*

ROBERT L. RICHARDSON, *Assistant Examiner.*

U.S. Cl. X.R.

315—102; 328—259